(12) United States Patent
Churchill

(10) Patent No.: US 12,226,843 B2
(45) Date of Patent: *Feb. 18, 2025

(54) OSCILLATING TOOL DRYWALL BLADE

(71) Applicant: IMPERIAL BLADES, Sun Prairie, WI (US)

(72) Inventor: Gregory C. Churchill, Portage, WI (US)

(73) Assignee: IMPERIAL BLADES, Sun Prairie, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,892

(22) Filed: Feb. 6, 2023

(65) Prior Publication Data

US 2023/0182221 A1 Jun. 15, 2023

Related U.S. Application Data

(63) Continuation of application No. 17/224,499, filed on Apr. 7, 2021, now Pat. No. 11,577,329, which is a (Continued)

(51) Int. Cl.
*B23D 61/18* (2006.01)
*B23D 59/00* (2006.01)
(Continued)

(52) U.S. Cl.
CPC .......... *B23D 61/18* (2013.01); *B23D 59/002* (2013.01); *B23D 61/006* (2013.01); (Continued)

(58) Field of Classification Search
CPC ...... B23D 61/006; B23D 61/00; B23D 49/11; B23D 61/18; B23D 59/002; B23D 61/123; (Continued)

(56) References Cited

U.S. PATENT DOCUMENTS

| 607,107 A | 7/1898 | Wuest |
| 1,771,664 A * | 7/1930 | Swick ............... B23D 51/14 |
| | | 30/166.3 |

(Continued)

FOREIGN PATENT DOCUMENTS

| EP | 0532913 A1 | 3/1993 |
| EP | 1857223 A1 | 11/2007 |

(Continued)

OTHER PUBLICATIONS

International Search Report and Written Opinion for International Application No. PCT/US2019/015656, Mailed Mar. 27, 2019, 10 pages, Aug. 21, 2023.

(Continued)

*Primary Examiner* — Evan H MacFarlane
(74) *Attorney, Agent, or Firm* — Michael Best & Friedrich LLP (57) ABSTRACT

An oscillating blade including a shank having a tool mounting end and a blade end, the shank defining a longitudinal shank axis extending from an oscillation axis of the tool mounting end, the longitudinal shank axis defining a longitudinal direction. The oscillating blade also includes a first shank extension extending from the blade end in a first lateral direction and having a first cutting edge directed in a first cutting direction, and a second shank extension extending from the blade end in a second lateral direction and having a second cutting edge directed in a second cutting direction. The oscillating blade also includes a shaving edge disposed on the blade end. The first shank extension is spaced from the second shank extension in the longitudinal direction, and the shaving edge is at least partially disposed between the first shank extension and the second shank extension in the longitudinal direction.

17 Claims, 5 Drawing Sheets

Related U.S. Application Data continuation of application No. 16/515,814, filed on Jul. 18, 2019, now abandoned, which is a continuation of application No. 15/887,570, filed on Feb. 2, 2018, now abandoned.

(51) Int. Cl.
*B23D 61/00* (2006.01)
*B23D 61/12* (2006.01)
*B23Q 16/00* (2006.01)
*B26B 7/00* (2006.01)

(52) U.S. Cl.
CPC ......... *B23D 61/123* (2013.01); *B23Q 16/001* (2013.01); *B26B 7/00* (2013.01)

(58) Field of Classification Search
CPC ....... B27B 19/006; B27B 19/008; B26B 7/00; Y10T 83/9319; A61B 17/14; A61B 17/142; A61B 17/144; A61B 17/32
USPC ......... 30/351, 353, 355, 356, 392–394, 347, 30/166.3, 501, 502; D8/20; 606/176, 606/178; 451/540, 356; 7/148, 150, 156, 7/158, 161, 163, 164
See application file for complete search history.

(56) References Cited

U.S. PATENT DOCUMENTS

| | | | |
|---|---|---|---|
| 5,038,478 | A | 8/1991 | Mezger et al. |
| 5,306,285 | A | 4/1994 | Miller et al. |
| 5,735,866 | A | 4/1998 | Adams et al. |
| 5,918,525 | A * | 7/1999 | Schramm ............. B23D 61/128 83/837 |
| 5,964,039 | A * | 10/1999 | Mizoguchi ........... B23D 61/006 83/835 |
| 6,875,222 | B2 | 4/2005 | Long et al. |
| D534,401 | S * | 1/2007 | Duffin .................. B23D 61/126 D8/20 |
| D697,384 | S | 1/2014 | Wackwitz |
| D741,136 | S | 10/2015 | Yang et al. |
| D809,355 | S | 2/2018 | Butscher et al. |
| D809,356 | S | 2/2018 | Butscher et al. |
| D862,185 | S | 10/2019 | Dai |
| 10,639,733 | B2 * | 5/2020 | Campbell ............ B23D 61/126 |
| 10,843,282 | B2 | 11/2020 | Churchill |
| D932,271 | S | 10/2021 | Xu |
| D962,027 | S | 8/2022 | Beck et al. |
| 11,577,329 | B2 * | 2/2023 | Churchill ............. B23D 59/002 |
| 2002/0104421 | A1 * | 8/2002 | Wurst .................. B23D 61/021 83/835 |
| 2007/0123893 | A1 * | 5/2007 | O'Donoghue ....... A61B 17/142 606/82 |
| 2012/0144676 | A1 | 6/2012 | Davidian et al. |
| 2013/0160631 | A1 | 6/2013 | Nagy et al. |
| 2013/0167382 | A1 | 7/2013 | Maras et al. |
| 2013/0269963 | A1 | 10/2013 | Fuchs |
| 2014/0190328 | A1 | 7/2014 | Karlen |
| 2014/0325855 | A1 | 11/2014 | Bozic |
| 2014/0345148 | A1 | 11/2014 | Kaye, Jr. et al. |
| 2015/0020671 | A1 * | 1/2015 | Meindorfer ............... B26B 9/02 83/697 |
| 2015/0135915 | A1 * | 5/2015 | Mann ................... B23D 61/006 83/13 |
| 2015/0273706 | A1 | 10/2015 | Martin |
| 2016/0082605 | A1 | 3/2016 | Marks |
| 2017/0291238 | A1 * | 10/2017 | Bernardi ............... B27B 19/006 |
| 2018/0117687 | A1 | 5/2018 | Rubens et al. |
| 2018/0194019 | A1 * | 7/2018 | Knox ..................... E04D 15/02 |
| 2019/0240752 | A1 | 8/2019 | Churchill |
| 2019/0337066 | A1 | 11/2019 | Churchill |

FOREIGN PATENT DOCUMENTS

| | | |
|---|---|---|
| EP | 3213847 A1 | 9/2017 |
| WO | 2019152408 A1 | 8/2019 |

OTHER PUBLICATIONS

Q-Bit SQ1000-S Outlet Box Cut-In Saw for Multi-Tools, in public use, on sale, or otherwise available to the public before 2018, https://www.parts-express.com/q-bit-sq1000-s-outlet-box-cut-in-saw-for-multi-tools-365-637, 4 pages.

Multi-Max MM435 Dremel Drywall Jab Saw, in public use, on sale, or otherwise available to the public before 2018, https://www.dremel.com/en_US/products/-/show-product/accessories/mm435-drywall-jab-saw, 2 pages.

International Search Report and Written Opinion for International Application No. PCT/US2019/015656, mailed Nov. 13, 2020, 17 pages.

International Preliminary Report on Patentability for International Application No. PCT/US2019/015656, mailed Dec. 3, 2020, 10 pages.

European Patent Office Action for Application No. 19705039.6 dated Feb. 27, 2024 (6 pages).

\* cited by examiner

OSCILLATING TOOL DRYWALL BLADE

CROSS-REFERENCE TO RELATED APPLICATIONS

This application is a continuation of U.S. patent application Ser. No. 17/224,499, filed Apr. 7, 2021, now U.S. Pat. No. 11,577,329, which is a continuation of U.S. patent application Ser. No. 16/515,814, filed Jul. 18, 2019, which is a continuation of U.S. patent application Ser. No. 15/887,570, filed Feb. 2, 2018, the disclosures of all of which are incorporated herein by reference in their entireties.

FIELD AND BACKGROUND

The present disclosure relates generally to oscillating tool blades, and more specifically to oscillating tool blades with blade features and measuring devices for accurately cutting and shaping sheet goods such as drywall.

Oscillating tools are hand-held, electrically or pneumatically powered, devices that transfer torque to an oscillating blade mounted on the tool. Oscillating blades are manufactured with various types of cutting edges to cut, abrade, or shape materials. Oscillating blades have also been manufactured with shanks that are bent to enable a cutting edge to be brought into contact with material at a desired angle.

Typically, oscillating blades have a single cutting edge intended to perform a specific task on a specific material. The cutting edges may be knife edge, saw teeth, or abrasive material. Blades are easily changed by a quick-connecting mount on the oscillating tool, so that any number of tasks can be performed using the oscillating tool by simply changing blades.

Drywall, cement board, gypsum board, and other types of sheet goods, including fiber board, particle board, and plywood (collectively referred to herein as "drywall") can be cut using oscillating blades, as well as by various other tools. Knives, routers, saws (both hand and powered) can be used for cutting sheets down to size or to make plunge cuts to create openings away from the edges of the board for access to electrical junction/gang boxes, plumbing, and structural features, for example.

Cutting openings in drywall for access to electrical junction/gang boxes requires precision because drywall openings that do not closely match the location or size of the junction/gang box require costly repairs or wasted materials. Various power tools have been developed to simplify the task. For example, a sheet of drywall installed on a wall will completely cover a junction/gang box, but by knowing the general location of the box, an installer can use a drywall router with a bit having an edge guide bearing against the junction/gang box to route an opening that closely matches the junction/gang box. A similar process can be done by hand.

One downside of this router process is that junction/gang boxes typically already contain wires or other sensitive components. Routing into and around junction/gang boxes can, therefore, risk damaging whatever is in or adjacent to the junction/gang box. Various types of protective covers can be installed over wires in the junction/gang boxes prior to drywall installation, but they require additional time and expense.

Another method requires cutting openings before the drywall is installed by accurately marking and cutting a hole or opening and installing the drywall. This method requires measuring the location of the mounted junction/gang box and transferring that measurement to the drywall. Once the location is marked on the drywall, the dimensions of the junction/gang box are used to mark and cut the opening. Accurate measuring and cutting with this method are critical, and difficult for the inexperienced drywall installer.

Oscillating tools can also be used to cut openings in drywall, and oscillating blades with saw teeth are less likely to damage wires because the degree of movement in an oscillating blade is only about two to five degrees, so they have a short stroke that is less likely to damage wires. Nonetheless, it is preferred to limit contact between power tools and wiring or other electrical and communication components installed in junction/gang boxes. Further, using an oscillating blade is not as accurate because oscillating blades do not bear against junction/gang boxes edges like router bits do. Thus, although useful, oscillating blades are not always as accurate as router bits, for example.

One oscillating blade developed for this purpose is an oscillating drywall blade sold under the brand name QBIT, part no. SQ1000-S, which is a box shaped blade having four walls and arcuate saw teeth for cutting into the drywall. The box-shaped blade matches the size of a single junction/gang box, so the opening need not be premeasured. Nonetheless, the oscillating motion of the blade does not align with all of the saw teeth, and the cut is not clean.

Another drywall blade is an oscillating drywall blade sold under the brand name DREMEL Multi-Max MM435 Drywall Jab Saw, which has a rearwardly directed saw blade and a rounded shank. The tip of the saw blade is used to jab drywall for an initial opening and then the saw blade is used to cut the opening, as previously marked on the drywall. This type of blade cuts drywall, but measuring and layout of the junction/gang box measurements is necessary, and the tool itself.

Thus, there is a need for an oscillating tool blade that quickly and easily cuts accurate holes in drywall.

SUMMARY

In some implementations, the disclosure provides an oscillating blade including a shank having a tool mounting end and a blade end, the shank defining a longitudinal shank axis extending from an oscillation axis of the tool mounting end, the longitudinal shank axis defining a longitudinal direction. The oscillating blade also includes a first shank extension extending from the blade end in a first lateral direction and having a first cutting edge directed in a first cutting direction, and a second shank extension extending from the blade end in a second lateral direction and having a second cutting edge directed in a second cutting direction. The oscillating blade also includes a shaving edge disposed on the blade end. The first shank extension is spaced from the second shank extension in the longitudinal direction, and the shaving edge is at least partially disposed between the first shank extension and the second shank extension in the longitudinal direction.

In some implementations, the disclosure provides an oscillating blade including a shank having a tool mounting end and a blade end, the shank defining a longitudinal shank axis extending from an oscillation axis of the tool mounting end, the longitudinal shank axis defining a longitudinal direction. The oscillating blade also includes a first shank extension extending from the blade end in a first lateral direction and having a first cutting edge directed in a first cutting direction, and a second shank extension extending from the blade end in a second lateral direction and having a second cutting edge directed in a second cutting direction. The oscillating blade also includes a depth gauge disposed on the shank, the depth gauge including at least three evenly spaced visual indicators of a plunge-cut depth of the first cutting edge. The first shank extension is spaced from the second shank extension in the longitudinal direction, and the depth gauge is at least partially disposed between the first shank extension and the second shank extension in the longitudinal direction In some implementations, the disclosure provides an oscillating blade including a shank having a tool mounting end and a blade end, the shank defining a longitudinal shank axis extending from an oscillation axis of the tool mounting end, the longitudinal shank axis defining a longitudinal direction. The oscillating blade also includes a cutting edge disposed on the blade end, and a depth gauge disposed on the blade end. The depth gauge includes a visual indicator of a plunge-cut depth of the cutting edge, the visual indicator including at least three evenly spaced notches formed in a side of the blade end. Each of the at least three evenly spaced notches is defined between two parallel sidewalls projecting from the blade end.

In some implementations, to address shortcomings in prior oscillating blades used to cut drywall, the present disclosure is directed to an oscillating blade having a shank with a tool mounting end and a blade end; a blade joined to the blade end and the blade has a predetermined width; and a depth gauge formed in the shank between the tool mounting end and the blade end, and the depth gauge is substantially registered with the blade to define depth-of-cut measurements.

The depth gauge may include a plurality of notches and/or reference numerals on the shank.

In one implementation, the shank defines a first axis and a second axis disposed at an angle to the first axis, and the blade orientation is substantially perpendicular to the second axis. The blade may be joined to the second portion and disposed substantially perpendicular to the second axis, and the oscillating blade second portion may include the depth gauge for efficiency of space.

The blade preferably includes a plurality of teeth and is arcuate in shape, but other arrangements and blade types can be used in the present disclosure.

The oscillating blade shank may include a laterally outwardly extending shank extension to support the blade and the shank extension may be narrower than the shank, and the shank extension may include a piercing tip.

The shank may optionally include a first portion and a second portion, and a shank extension that extends laterally outwardly from the second portion to define a laterally extending piercing tip.

The oscillating blade may further include a fixed caliper gauge and the caliper gauge may have a first marking tip joined to the shank; and a second marking tip joined to the shank and spaced part from the first marking tip to define the fixed caliper gauge. The first caliper tip may be joined to the shank adjacent to the blade; and the second caliper tip may be joined to the shank tool mounting end, and spaced apart from the first caliper tip to define the marking caliper having a dimension that matches the height of a gang box or the width of a double gang box. The second caliper tip may include a piercing tip, and an extreme marking edge spaced apart from the piercing tip to provide accurate indentation marking on soft materials.

The oscillating blade may further include a reverse direction blade joined to the shank, and the reverse direction blade may include a dagger blade joined to and extending laterally outwardly from the shank.

The dagger blade shank may be joined to the blade shank and include a dagger tip joined to the dagger blade shank, and the reverse direction blade may define a plurality of saw teeth joined to the dagger blade shank. Alternatively, rather than simply being arranged in a reverse direction, the saw teeth can be directed in a direction that is substantially different from a cutting direction of the blade.

DETAILED DESCRIPTION

In the following detailed description of drawings, the same reference numeral will be used to identify the same or similar item in each of the figures.

Figure 1:
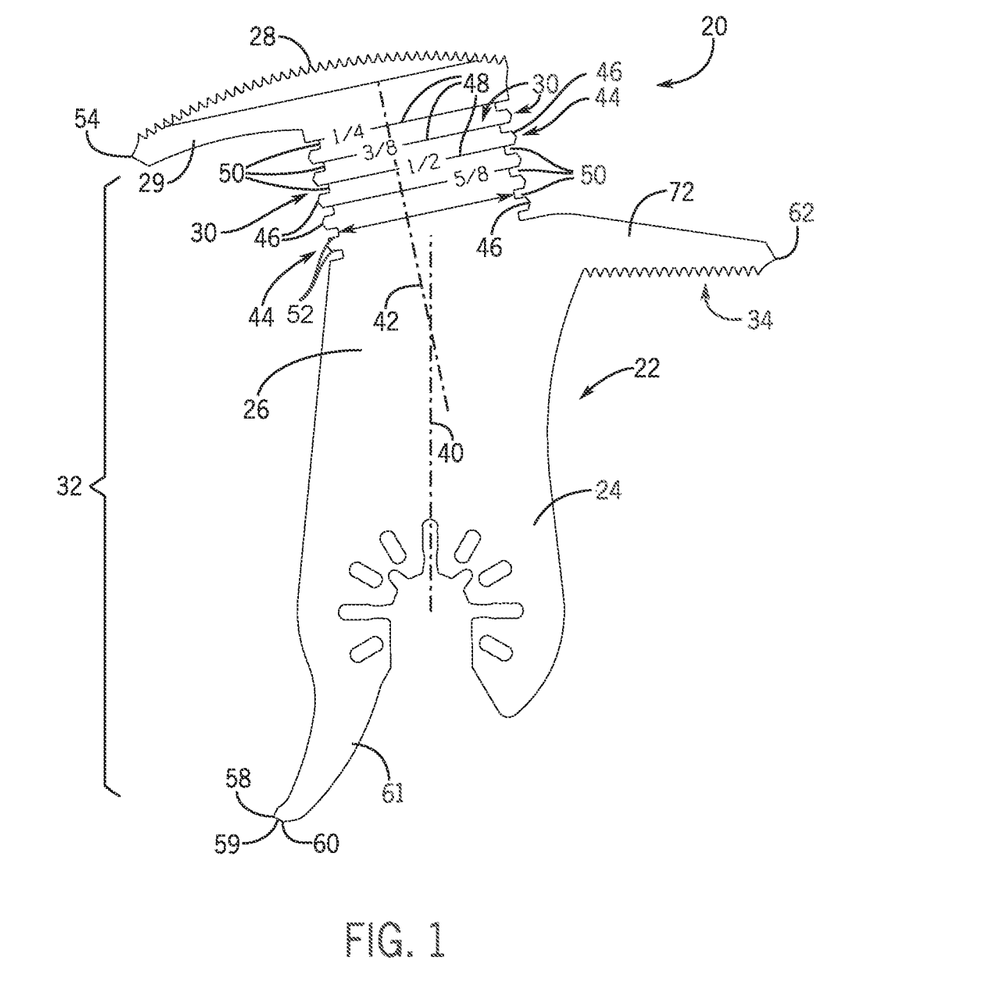
FIG. 1 is a front view of an oscillating tool drywall blade in accordance with the present disclosure.
Figure 2:
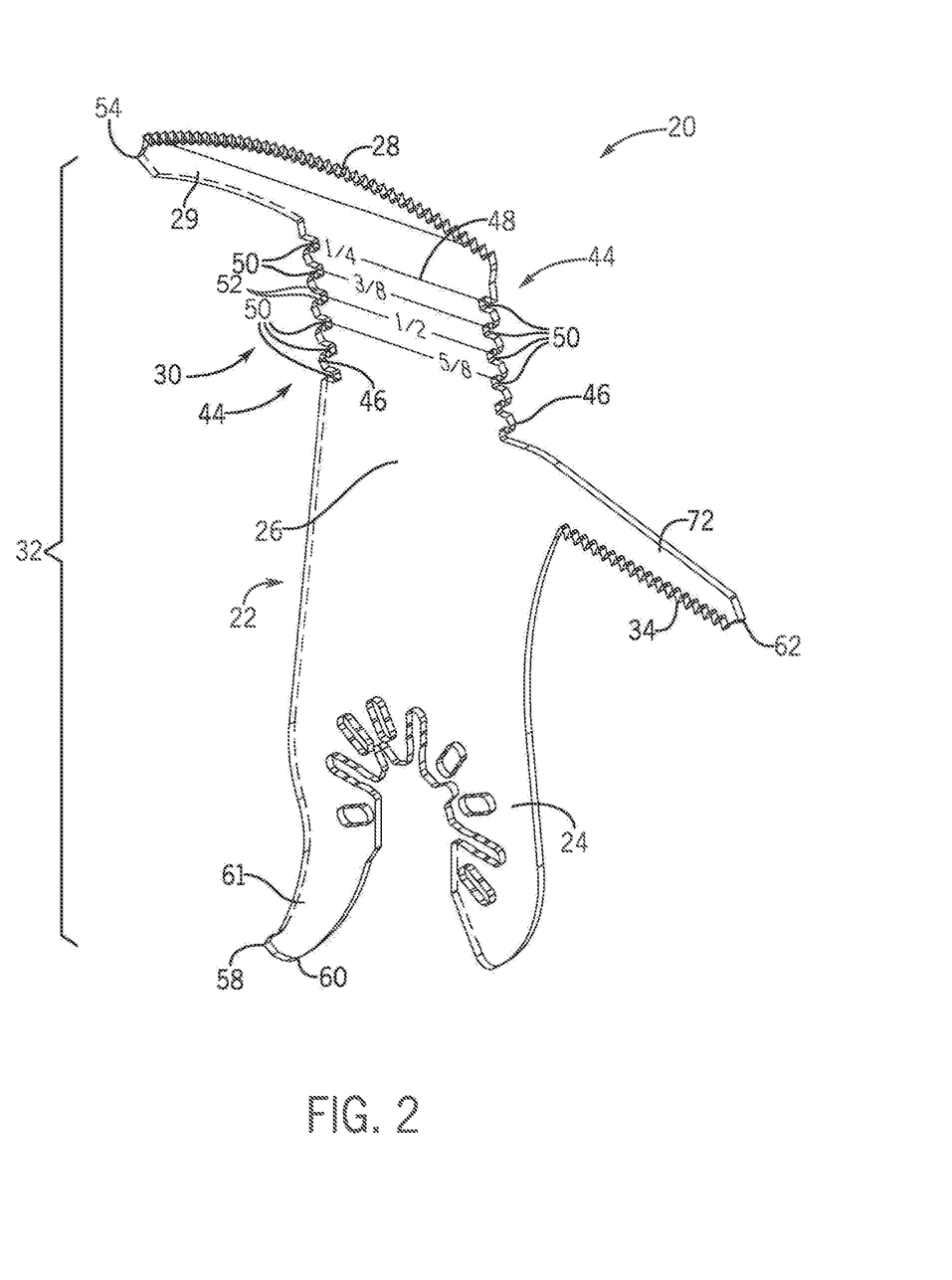
FIG. 2 is a perspective view of the oscillating tool drywall blade of FIG. 1.
Figure 3:
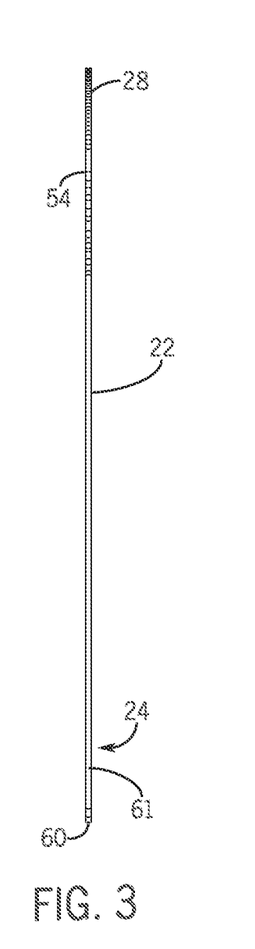
FIG. 3 is a side view of the oscillating tool drywall blade of FIG. 1.

As seen in FIGS. 1 through 3, there is depicted an oscillating tool blade 20 for use in cutting or otherwise shaping drywall, cement board, gypsum board, plywood, particle board, and other similar sheet materials (referred to generically herein as "drywall") through which holes must be cut to access electrical junction/gang boxes, window frames, plumbing, telephone boxes, and other similar building components. The illustrated oscillating tool blade 20 includes: a shank 22 having a tool mounting end 24; a blade end 26; a blade 28; a depth gauge 30; a caliper portion 32; and a reverse direction blade 34.

The shank 22 is preferably planar and made of any suitable material including high carbon steel, spring steel, and bi-metal composites, for example, although it can be made of any suitable material and of any shape, including having reinforcing ribs formed in it, for example. The shank 22 tool mounting end 24 is shaped, and perforated to be received into a mating oscillating tool mount. The term "end" as used to describe portions of the oscillating tool blade 20, includes a portion (not just the edge) of the shank 22 that is engaged with the oscillating tool or the blade 28 or any other feature described herein. Further, the shape and design of the tool mounting end 24 can vary within the scope of this disclosure to accommodate any oscillating tool mount design, of which there are many. Thus, the illustrated tool mounting end 24 is a generic version for purposes of illustration only. Similarly, the blade "end" 26 is a term used to reference a portion of the shank 22 which supports the blade 28, and the tool mounting end 24 and the blade end 26 can overlap or be the same portion of the oscillating tool blade 20.

The shank 22 tool mounting end 24 in the illustrated implementation defines a first shank axis 40, and the blade end 26 defines a second blade axis 42 that is preferably disposed at an angle to the first shank axis 40, and more preferably at an angle of about 11.1 degrees for the illustrated implementation. Further, the overall length and width of the shank 22 is determined from considerations including: tool-to-material clearance, mass balance of the oscillating tool blade 20; and projected depth of cut, as examples.

Preferably, the blade 28 is substantially perpendicular to the second axis. Such a configuration provides improved balance and stability of the blade as it is oscillating, and also improved visibility of the blade 28 during operation, as well as improved access to a sheet of drywall for the reverse direction blade 34, as described in more detail below. The shank 22 shape can be changed to accommodate other arrangements of the blade 28 and the reverse direction blade 34, material clearance, and mass balance for minimizing vibration.

The blade 28 is illustrated as a row of saw teeth in a arcuate pattern, but other blade types, such as knife edges and abrasives, can be used. Further, the illustrated arcuate pattern of the blade 28 is preferred, but a straight pattern or even stacked rows of teeth or other cutting arrangements can be provided, including v-shaped patterns, for example.

The blade 28 is illustrated as being wider than most of the shank 22, but other relative blade 28 widths and shapes can be used in accordance with the present disclosure. The shank 22 is illustrated having a shank extension 29 extending outwardly (and to the left), but this specific arrangement is not critical. Nonetheless, by providing a shank extension 29, the blade 28 can be used to cut smaller holes and even round holes, and with precise control.

In a preferred implementation, the dimension of the blade 28 from end-to-end is about 2.15 inches, which is a dimension preselected to match the size of a standard electric junction/gang box 70 plus an approximate motion range of a typical oscillating tool. (See FIG. 4.) Thus, in operation, the blade 28 will match width 31 (or length dimension 74, if desired) of a standard electric junction/gang box 70 when it is oscillating in an oscillating tool. Of course, other blade dimensions can be used, but matching a width of a standard electric junction/gang box 70 simplifies operation and improves accuracy without requiring an operator to perform calculations or guess about where the standard electric junction/gang box 70 walls are located because of the blade dimension and caliper feature described below.

The shank 22 further includes the depth gauge 30, so that an operator can see a depth to which the blade 28 has penetrated the drywall in a plunge cut. The depth gauge 30 is registered from a leading edge of the blade 28, so that an operator can readily determine a depth (or approximate depth) into the drywall to which the blade 28 has penetrated. The plunge depth would preferably match the drywall thickness, so that once the blade 28 has penetrated a full thickness of the drywall, the operator can withdraw the blade 28. This can be helpful when a hole is being cut after the drywall has been installed to protect wiring, telephone and communications lines, plumbing, and other items installed behind the drywall, for example.

The depth gauge 30 can be created using various indicators such as markings 48 on the shank 22 face, but preferably notches 50 are formed in one or both sides of the shank 22 are used to provide a visual indicator when a desired plunge depth has been reached. Color coded depth marks or raised blade shank 22 portions can also be provided, for example, and multiple indicators can be used. The formed notches 50 are particularly helpful when other markings are covered by dust. Further, the notches 50 are illustrated as being aligned with the markings 48 and disposed between the tapered points 46 for efficiency, but the depth gauge 30 and the shaving edge 44 can be spaced apart.

The illustrated oscillating tool blade 20 further includes a pair of shaving edges 44 to make relatively minor or fine adjustments to an edge or opening in drywall. Each of the pair of shaving edges 44 includes a plurality of pairs of parallel sidewalls 52 projecting from the blade end. The shaving edges 44 in the illustrated implementation include the tapered points 46 extending at least partially along lateral edges of the blade shank 22. The tapered points 46 are defined by a respective pair of parallel sidewalls of the plurality of pairs of sidewalls 52. The shaving edges 44 can be used to make minor changes to drywall openings or edges for more precise fitment and alignment with structural features, concealed electrical/gang boxes or other items.

The shaving edges 44 are illustrated on opposite sides of the shank 22, but only one shaving edge 44 is necessary for this feature, and the shaving edge 44 can be any desired length, and each shaving edge preferably extends outwardly about 0.078 inches in length. Further, the tapered points 46 can be other shapes, have other spacings, or even be formed on other blade shank 22 edges to fine-tune drywall edges and openings. Also, the shaving edge 44 is illustrated as spaced apart tapered points 46, but knives, abrasives, or other types of edges can be used in accordance with this disclosure. Further, as with any blade or cutting edge on the oscillating tool blade 20, the thickness of the shank 22 or blades can be tapered to provide a slightly shaper or more aggressive cutting edge.

The caliper portion 32 includes a first marking tip 54 joined directly or indirectly to the shank 22. In the illustrated implementation, the first marking tip 54 is disposed adjacent to the blade 28 or on the shank extension 29 to enable cutting smaller holes or accurate shapes. The first marking tip 54 can also be used as a piercing tip to penetrate drywall by pushing the tip into the drywall.

Figure 4:
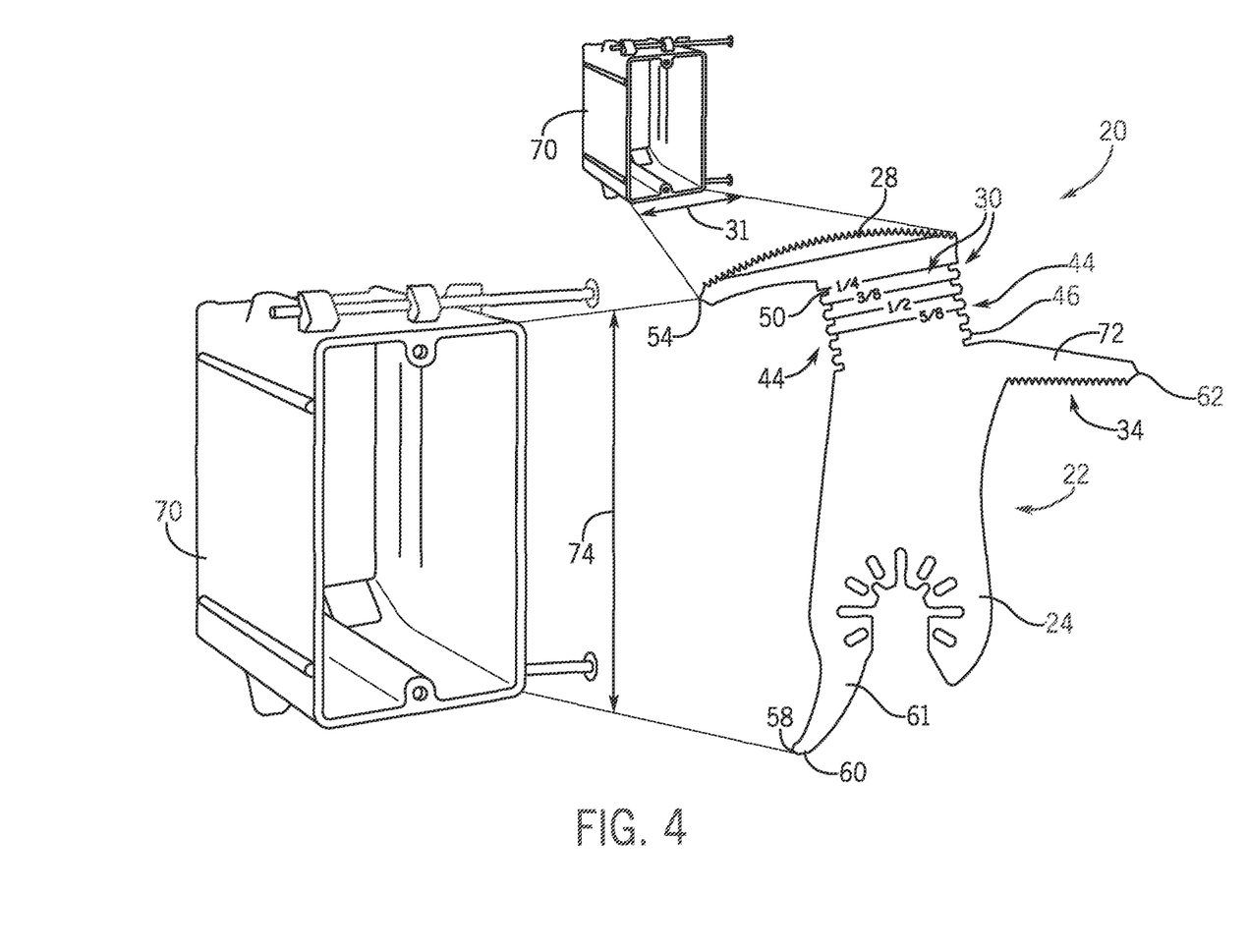
FIG. 4 is a perspective view of standard electrical junction/gang boxes juxtaposed with an oscillating tool drywall blade in accordance with the present disclosure.

A second marking tip 58 is spaced apart from the first marking tip 54 to define a predetermined caliper dimension, which preferably matches a height dimension of a junction/gang box that is hidden behind or will be exposed through a hole in a sheet of drywall (See FIG. 4.)

Figure 5:
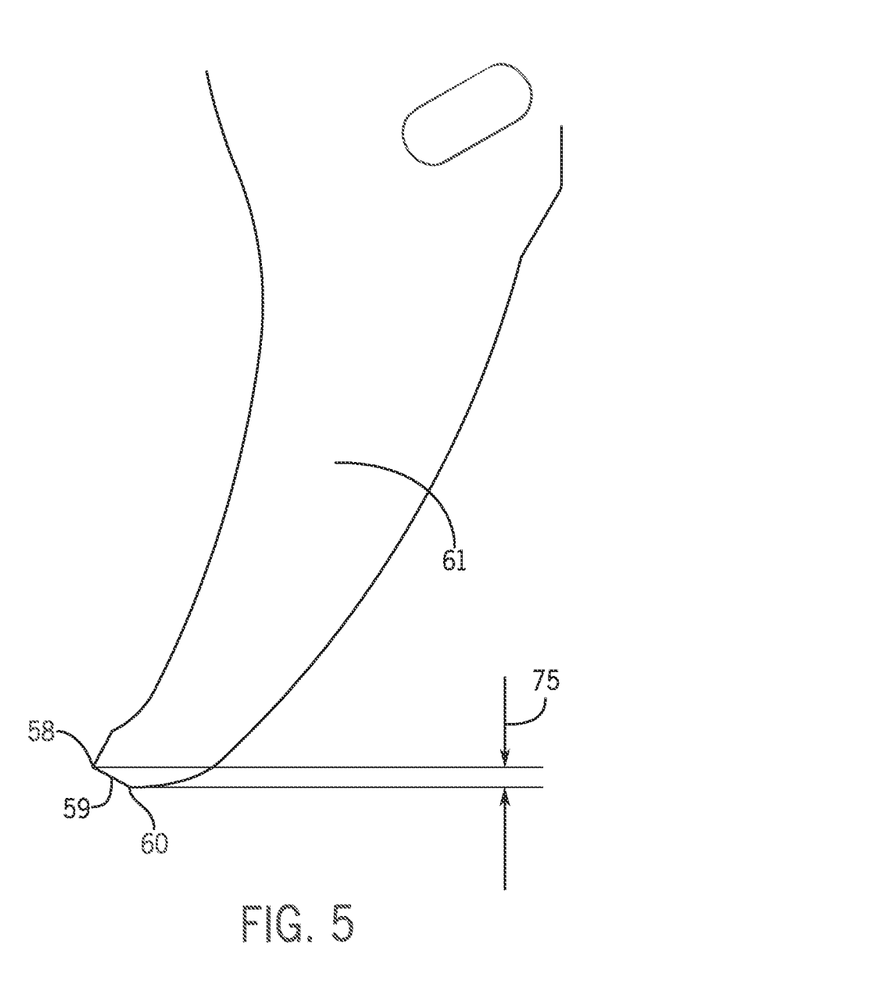
FIG. 5 is a detailed view of a caliper point in accordance with the present disclosure.

The second marking tip 58 is preferably mounted on a rear shank extension 61 can be used to pierce a paper cladding on the drywall as a visual indicator of one end of a predetermined cutting dimension. Nonetheless, when piercing the paper cladding, a marking tip of any kind can pierce into the underlying gypsum material, and result in a tapered portion 59 of the second marking tip 58 to widen the visual marking 75 in the paper, which can obscure the exact point of the predetermined dimension of the caliper portion 32. The present disclosure, therefore, uses the second marking tip 58 only to pierce the paper cladding and further pressure forces the tapered portion 59 into the drywall to widen the paper opening until an extreme edge 60 is pressed into the paper cladding. It is the paper opening caused by the extreme edge 60 that indicates one of the end points of the predetermined dimension of the caliper portion 32. To accomplish this task, the second marking tip 58 is spaced inwardly along the caliper portion 32 a length dimension 74 to provide a relatively simple and accurate dimension mark on the drywall. The length dimension 74 is preferably 3.75 inches, but the exact length dimension 74 can vary so long as it serves the function of spacing the second marking tip 58 and the extreme edge 60 apart for precise marking in soft materials. In addition, the length dimension 74 approximately matches the width of a double wide electric junction/gang box, so after marking the width with the caliper portion 32, the blade 28 can be used to cut the entire width of the electric junction/gang box with two plunge cuts, for example.

The caliper portion 32 is preferably used when the oscillating tool is not operating, so that an accurate location of the junction/gang box can be marked on the drywall using the first marking tip 54 and the second marking tip 58. Once marked, the drywall can be accurately cut with the blade 28 in both position and size.

At times, it is preferred or desirable to use an oscillating blade in a pull stroke. Accordingly, the reverse direction blade 34 is provided as a lateral extension from the shank 22 on a dagger blade shank 72. Preferably, the reverse direction blade 34 includes a row of saw teeth, but other blade types, including knives and abrasives, are possible. The reverse direction blade 34 also preferably includes a dagger tip 62 to be used to puncture the drywall for inserting the reverse direction blade 34 and cutting drywall with a pull stroke. It is preferred that the dagger tip 62 be sharp enough to initiate a cut, but robust enough to avoid damage from contacting other building materials. This feature is also desirable in the tips described above. A reverse blade length of about an inch is long enough to cut through most thicknesses of drywall and provide clearance from an oscillating tool head.

It is also desirable to provide the reverse direction blade 34 with the relatively narrow dagger blade shank 72 for cutting smaller and/or curved openings, such as for pipes or conduits. When such a blade is desired, the blade can be oriented in any desired direction, including forward, angled, and reverse (as illustrated).

The arrangement of the oscillating tool blade 20 elements as described above provides balance and minimized extraneous vibration during use. If one or more of the elements is changed or omitted, or another element is added, the sizes, shapes, and orientations of other elements can be changed accordingly.

Also, as stated above, the term "drywall" is to be understood herein to include drywall, sheet rock, gypsum board, cement board, particle board, fiber board, plywood, and any sheet-like material, including doors and other wooden panels. Thus, the term "drywall" is not intended to be limiting and, conversely, is intended to include and identify other materials, the names of which can be used interchangeably with "drywall."

The foregoing detailed description is provided for clearness of understanding only, and no unnecessary limitations therefrom should be read into the following claims.

What is claimed is:

1. An oscillating blade comprising:
   a shank having a tool mounting end and a blade end, the shank defining a longitudinal shank axis extending from an oscillation axis of the tool mounting end, the longitudinal shank axis defining a longitudinal direction;
   a first shank extension extending laterally outward from a first side of the blade end in a first lateral direction and having a first cutting edge directed in a first cutting direction, wherein the first cutting edge includes a plurality of teeth;
   a second shank extension extending laterally outward from a second side of the blade end in a second lateral direction and having a second cutting edge directed in a second cutting direction, wherein the second cutting edge includes a plurality of teeth; and
   a shaving edge disposed on the blade end;
   wherein the first shank extension is spaced from the second shank extension in the longitudinal direction, and
   wherein the shaving edge is at least partially disposed between the first shank extension and the second shank extension in the longitudinal direction.

2. The oscillating blade of claim 1, further comprising a depth gauge including at least three evenly spaced visual indicators disposed on the blade end and indexed with the first cutting edge to correspond to a cutting depth of the first cutting edge.

3. The oscillating blade of claim 2, wherein the depth gauge is at least partially disposed between the first shank extension and the second shank extension in the longitudinal direction.

4. The oscillating blade of claim 2, wherein the at least three evenly spaced visual indicators include markings on a face of the shank, the oscillating blade further comprising at least three notches formed in at least one of the first side and the second side of the blade end and aligned with the markings on the face of the shank to also visually indicate a plunge-cut depth of the first cutting edge.

5. The oscillating blade of claim 1, wherein the first cutting direction is away from the tool mounting end such that the first cutting edge is configured to cut with a push stroke, and the second cutting direction is toward the tool mounting end such that the second cutting edge is configured to cut with a pull stroke.

6. The oscillating blade of claim 1, wherein the shaving edge is a first shaving edge, and further comprising:
   a second shaving edge disposed on the blade end at least partially between the first shank extension and the second shank extension in the longitudinal direction.

7. The oscillating blade of claim 6, wherein the first and second shaving edges are parallel.

8. The oscillating blade of claim 7, wherein the first and second shaving edges include notches, and wherein the first and second shaving edges include a plurality of pairs of parallel sidewalls, and wherein each of the notches is defined directly between a respective pair of parallel sidewalls of the plurality of pairs of sidewalls.

9. The oscillating blade of claim 1, wherein the shaving edge comprises:
   a plurality of tapered points spaced apart by notches.

10. The oscillating blade of claim 9, wherein each of the tapered points tapers from a respective rectangular projection of a plurality of rectangular projections, wherein the notches are defined between the plurality of rectangular projections.

11. The oscillating blade of claim 1, wherein the shaving edge includes notches at one-eighth-inch increments.

12. The oscillating blade of claim 1, wherein the second cutting edge is linear.

13. An oscillating blade comprising:
   a shank having a tool mounting end and a blade end, the shank defining a central longitudinal shank axis extending from an oscillation axis of the tool mounting end, the central longitudinal shank axis defining a longitudinal direction;
   a first shank extension extending laterally outward from a first side of the shank in a first lateral direction and having a first cutting edge directed in a first cutting direction, wherein the first cutting edge extends across a front of the shank and intersects the central longitudinal axis of the shank;
   a second shank extension extending laterally outward from a second side of the shank in a second lateral direction and having a second cutting edge directed in a second cutting direction;
   a first plurality of tapered points extending along a first lateral edge of the shank between the first shank extension and the second shank extension;
   a second plurality of tapered points extending along a second lateral edge of the shank between the first shank extension and the second shank extension; and a depth gauge disposed on the shank between the first lateral edge and the second lateral edge, the depth gauge including at least three evenly spaced visual indicators of a plunge-cut depth of the first cutting edge;

wherein the first shank extension is spaced from the second shank extension in the longitudinal direction.

14. The oscillating blade of claim 13, wherein the at least three evenly spaced visual indicators include markings on a face of the shank, the oscillating blade further comprising:
at least three notches formed in at least one of the first side and the second side of the shank and aligned with the markings on the face of the shank to also visually indicate the plunge-cut depth of the first cutting edge.

15. The oscillating blade of claim 13, wherein the at least three evenly spaced visual indicators include notches formed in at least one of the first side and the second side of the shank.

16. The oscillating blade of claim 15, wherein the notches are rectangular.

17. The oscillating blade of claim 15, wherein the first plurality of tapered points or the second plurality of tapered points forms a shaving edge, the shaving edge including a plurality of pairs of parallel sidewalls and wherein a shape of each of the notches is at least partially defined by a respective pair of parallel sidewalls of the plurality of pairs of sidewalls.

* * * * *